United States Patent
Mukai et al.

(10) Patent No.: US 7,106,165 B2
(45) Date of Patent: Sep. 12, 2006

(54) FUSE, BATTERY PACK USING THE FUSE, AND METHOD OF MANUFACTURING THE FUSE

(75) Inventors: Takahiro Mukai, Miyazaki (JP); Masatoshi Izaki, Miyazaki (JP); Yoshio Sakamoto, Miyazaki (JP); Kenji Senda, Fuki (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 10/878,741

(22) Filed: Jun. 29, 2004

(65) Prior Publication Data

US 2005/0001710 A1    Jan. 6, 2005

(30) Foreign Application Priority Data

Jul. 1, 2003    (JP)    ............... 2003-189354

(51) Int. Cl.
*H01H 37/76*    (2006.01)

(52) U.S. Cl. .................... 337/405; 337/401

(58) Field of Classification Search ........... 337/290, 337/297, 142, 152, 158, 293, 159, 163, 186, 337/187, 227, 295, 404, 405, 414, 416; 29/623
See application file for complete search history.

(56) References Cited

U.S. PATENT DOCUMENTS

| | | | |
|---|---|---|---|
| 2,111,628 A | 3/1938 | Hoban | |
| 4,494,104 A | 1/1985 | Holmes | |
| 4,823,783 A | 4/1989 | Willhite, Jr. et al. | |
| 5,059,277 A | 10/1991 | Willhite, Jr. et al. | |
| 5,097,247 A | 3/1992 | Doerrwaechter | |
| 5,712,610 A | 1/1998 | Takeichi et al. | |
| 5,939,969 A | 8/1999 | Doerrwaechter et al. | |
| 5,982,268 A | 11/1999 | Kawanishi | |
| 6,040,754 A | 3/2000 | Kawanishi | |
| 6,064,293 A * | 5/2000 | Jungst et al. | ............... 337/290 |
| 6,373,371 B1 | 4/2002 | Doerrwaechter et al. | |
| 6,556,122 B1 | 4/2003 | Izaki et al. | |
| 6,774,761 B1 * | 8/2004 | Tanaka | ................. 337/296 |
| 2002/0113685 A1 | 8/2002 | Izaki et al. | |
| 2004/0070486 A1 * | 4/2004 | Senda et al. | ............... 337/405 |

FOREIGN PATENT DOCUMENTS

| | | |
|---|---|---|
| EP | 0 964 419 | 12/1999 |
| JP | 56-69735 | 6/1981 |

(Continued)

OTHER PUBLICATIONS

Patent Abstract of Japan, vol. 1999, No. 10, Aug. 31, 1999 & JP 11 126553 (Uchihashi Estec Co., Ltd.), May 11, 1999.

*Primary Examiner*—Lisa Lea-Edmonds
*Assistant Examiner*—Corey Broussard
(74) *Attorney, Agent, or Firm*—Wenderoth, Lind & Ponack, L.L.P.

(57) ABSTRACT

A fuse has a pair of lead terminals disposed on a substrate, an intermediate layers for welding formed on the surface of at least one of the lead terminals, and a fuse element. The fuse element is welded to the pair of lead terminals through the intermediate layer so as to span the same. Further, the intermediate layer is formed on at least one of the lead terminals except a face thereof opposing each other. Owing to this configuration, after the fuse has melted down, the melted fuse element is prevented from being spread out into the space between the opposing faces of the lead terminals and insulation therebetween is secured.

25 Claims, 7 Drawing Sheets

FOREIGN PATENT DOCUMENTS

| | | |
|---|---|---|
| JP | 60-260320 | 12/1985 |
| JP | 62-270320 | 11/1987 |
| JP | 2-244530 | 9/1990 |
| JP | 5-198246 | 8/1993 |
| JP | 7-153367 | 6/1995 |
| JP | 8-031283 | 2/1996 |
| JP | 8-161990 | 6/1996 |
| JP | 9-017302 | 1/1997 |
| JP | 9-131796 | 5/1997 |
| JP | 10-283890 | 10/1998 |
| JP | 11-016466 | 1/1999 |
| JP | 11-273520 | 10/1999 |
| JP | 11-353995 | 12/1999 |
| JP | 2000-036237 | 2/2000 |
| JP | 2000-040454 | 2/2000 |
| JP | 2001-113784 | 4/2000 |
| JP | 2000-164093 | 6/2000 |
| JP | 2001-229796 | 8/2001 |
| JP | 2001-345035 | 12/2001 |
| JP | 2002-015649 | 1/2002 |
| JP | 2002-033035 | 1/2002 |
| JP | 2002-42621 | 2/2002 |
| JP | 2002-182480 | 6/2002 |
| JP | 2002-184281 | 6/2002 |
| JP | 2002-197955 | 7/2002 |
| JP | 2002-197956 | 7/2002 |
| JP | 2002-197957 | 7/2002 |
| JP | 2002-198032 | 7/2002 |
| JP | 2003-203552 | 7/2003 |
| JP | 2003-234053 | 8/2003 |
| KR | 1998-0011565 | 4/1998 |
| WO | 02/067282 | 8/2002 |

\* cited by examiner

FUSE, BATTERY PACK USING THE FUSE, AND METHOD OF MANUFACTURING THE FUSE

TECHNICAL FIELD

The present invention relates to a fuse used for preventing failure of electronic equipment and the like due to abnormal heating and overcurrent, a battery pack using the fuse, and a method of manufacturing the fuse.

BACKGROUND ART

In order to prevent occurrence of a failure of electronic equipment due to abnormal heating of a pack battery used in electronic equipment such as mobile telephones, it is required that a temperature fuse be mounted on the pack battery. It is also required that a current fuse be mounted on electronic equipment to prevent occurrence of a failure due to abnormal current.

In a conventional temperature fuse, a fuse element which melts down when it reaches a predetermined temperature is provided at its both ends with terminal portions and the terminal portions are connected to a circuit such as a power supplying circuit. When abnormal heating is produced in a component constituting a power supply or the like (such as a battery), the fuse element serves its function at a high temperature caused by the abnormal heating. Thus, the temperature fuse is adapted to break the circuit to prevent the internal components and the like from being damaged.

In the conventional fuse, a fuse element made of a fusible member is welded to a pair of lead terminals so as to span the same, and thereby, it is electrically connected to the lead terminals. Fuses of the described type are disclosed in, for example, Japanese Unexamined Patent Publication No. H11-273520 and Japanese Unexamined Patent Publication No. 2002-33035. In those cases, an intermediate layer for welding is provided between the fuse element and the lead terminal for ensuring good welding of the fuse element to the lead terminal.

FIG. 11 is a lateral sectional view of a prior art fuse. FIG. 12 is a lateral sectional view of fuse element 104 as have been melted down. The fuse is constructed by disposing a pair of lead terminals 100 on substrate 103 and by welding fuse element 104 to lead terminals 100 through plated layer 101 provided on the surface of lead terminals 100. Though it is not shown, some flux or a cover may be provided on fuse element 104. A fuse is manufactured in the following way. First, a pair of lead terminals 100 are disposed on substrate 103. Then, plated layers 101 are formed on the pair of lead terminals 100 arranged as above. At this time, plated layers 101 are formed so far as they are even spread on opposing faces 102 of lead terminals 100. Fuse element 104 is placed on plated layers 101 and pressed and heated from its upper side to be welded to plated layers 101. A fuse is manufactured through the above described steps.

However, in the prior art fuse, plated layers 101 are formed to be extended over opposing faces 102. Therefore, when fuse element 104 is welded, spread-out portions 105 thereof are formed on the opposing portions so that the insulation distance between lead terminals 100 opposing each other is shortened. Furthermore, when fuse element 104 is melted down, melted fuse element 104 is spread out over opposing faces 102, whereby large spread-out portions 105 are formed as shown in FIG. 12. Then, the insulation distance between opposing lead terminals 100 becomes still shorter after the melting down of the fuse element. Hence, insulating capability becomes insufficient though the fuse element is melted down.

In a case of a large sized fuse, it is no problem if there exist spread-out portions 105 because lead terminals 100 originally have a large face-to-face distance. However, in these days, electronic equipment is becoming increasingly smaller in size and lower in profile. Also with respect to batteries having fuses mounted thereon, advances are being made in making them lower profiled and smaller sized. This makes it indispensable to make the fuse smaller sized and lower profiled and it is naturally required to narrower the face-to-face distance of lead terminals 100. However, there is a limit in making the face-to-face distance narrower due to the deterioration of insulating capability caused by existence of spread-out portions 105. Hence, it is required to previously provide a sufficiently large face-to-face distance. As a result, it becomes impossible to make the fuse smaller sized and lower profiled.

SUMMARY OF THE INVENTION

A fuse of the present invention has a substrate, a pair of lead terminals disposed on the substrate, an intermediate layer for welding formed on the surface of at least one of the lead terminals, and a fuse element made of a fusible member. The fuse element is welded to the pair of lead terminals through the intermediate layer such that is spans the pair of lead terminals. The intermediate layer is formed on at least one of the lead terminals except a face thereof opposing each other. Further, a method of manufacturing a fuse of the present invention includes a step of connecting a pair of lead terminals onto a substrate, a step of forming an intermediate layer for welding on the surface of at least one of the lead terminals except a face of thereof opposing each other, and a step of welding the fuse element to the intermediate layer.

DETAILED DESCRIPTION OF PREFERRED EMBODIMENTS

An exemplary embodiment of the present invention will be described with reference to the accompanying drawings. A case where a single structure of a plated layer is used for the intermediate layer for welding, or a case where a combined structure of a plated layer and a meltable layer for welding is used therefor, will be taken as an example in the following description.

Figure 1:
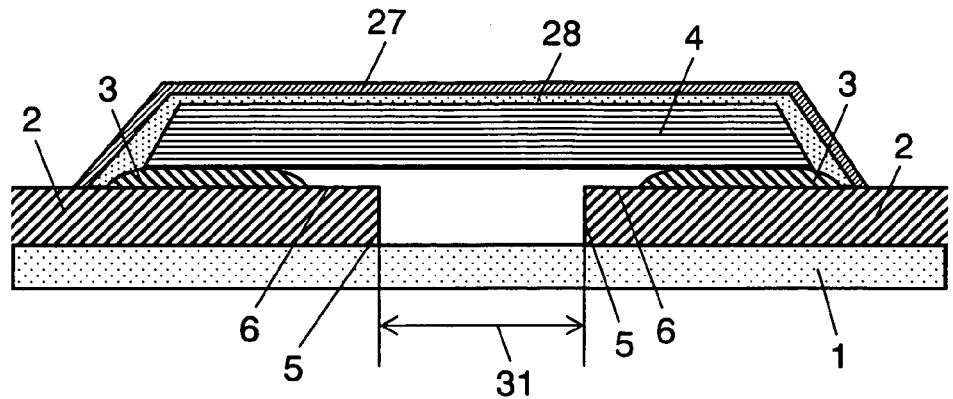
FIG. 1 is a lateral sectional view of a fuse in an embodiment of the present invention.
Figure 2A:
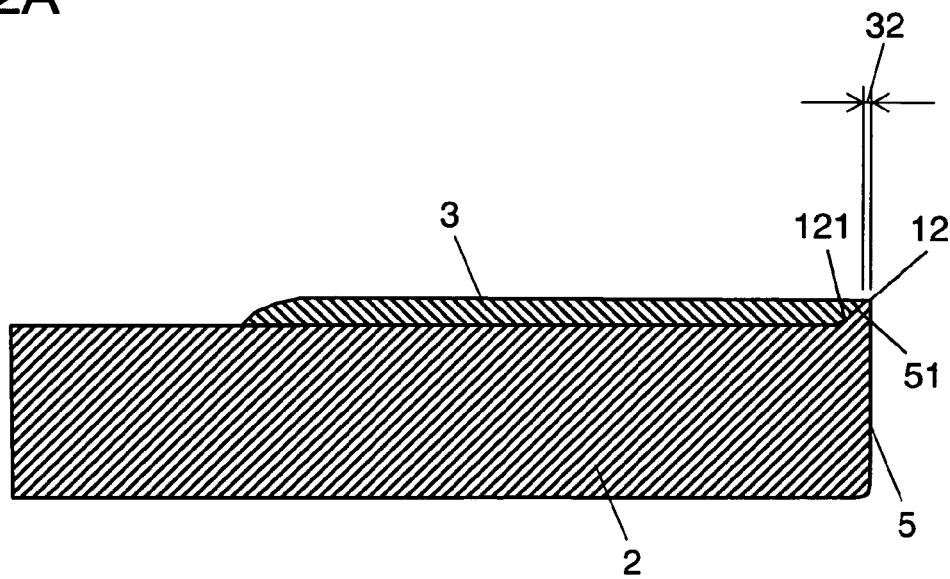
FIG. 2A is a lateral sectional view of a lead terminal in the fuse shown in FIG. 1.
Figure 2B:
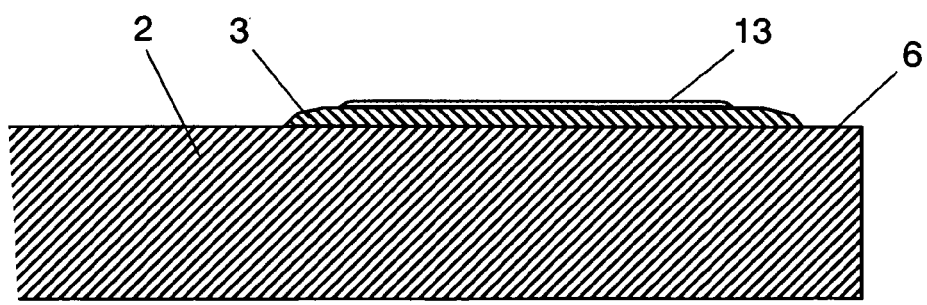
FIG. 2B is a lateral sectional view of another lead terminal in an embodiment of the present invention.

FIG. 1 is a lateral sectional view of a fuse in the first exemplary embodiment of the present embodiment. FIG. 2A and FIG. 2B are lateral sectional views of lead terminals. FIG. 3 to FIG. 7 are drawings showing steps in manufacturing the fuse and FIG. 8A to FIG. 8C are drawings showing steps in welding the fuse element. FIG. 9 is a perspective view of a fuse melted down.

Substrate 1 is made of an insulating material, such as a plastic, glass, or ceramic material, or it may be made of metal with an insulating coating formed thereon. In the present embodiment, an alumina ceramic plate is used as substrate 1. Substrate 1 may be formed not only of a rectangular plate but also of a disk, oval, triangular, pentagonal, or a polygonal plate in polygonal number of five or larger. A pair of lead terminals 2 are bonded onto substrate 1 and arranged to oppose each other. Lead terminals 2 are made of an electrically conductive material and preferably made of metal. To be concrete, a single metallic material, at least, selected from iron, nickel, copper, aluminum, gold, silver, and tin, or an alloy made of the metallic materials may be used. Otherwise, a metallic material and the like obtained by adding an element or elements not belonging to the above material group to a single material, at least, selected from the above material group or an alloy may be used.

As the material for bonding lead terminal 2 onto substrate 1, a plastic resin, glass, or a metallic film containing a plastic resin or glass may be used. When a metallic film is used as a bonding agent, the metallic film is formed on substrate 1 by printing or the like, lead terminals 2 are placed on the metallic film, and lead terminals 2 are bonded to substrate 1 by such a method as ultrasonic welding. When the material of substrate 1 is a thermoplastic resin, such a method may also be used as to place lead terminals 2 on substrate 1 and then apply quick heating, followed by quick cooling, to them to have the surface of substrate 1 directly melted. In the present embodiment, a nickel plate with its surface plated with tin is used as lead terminal 2 and an epoxy resin containing filler formed of alumina and silica is used as the bonding agent.

A pair of lead terminals 2 are arranged to have their opposing faces 5 opposing each other across face-to-face distance 31. When a fuse is made small in size, distance 31 must be reduced correspondingly. It is an important factor how to reduce distance 31 in realizing a small-sized fuse. When distance 31 is extremely small, a sufficient insulating capability cannot be provided between lead terminals 2 after melting down of fuse element 4. Accordingly, distance 31 needs to be large enough to secure the insulating capability.

Plated layers 3 are formed on the surfaces of lead terminals 2. At this time, plated layers 3 are formed on the surfaces except, at least, opposing faces 5. Further, there are provided non-plated regions 6 in the ranges of a predetermined distance from the end faces of lead terminals 2 opposing each other. In other words, plated layers 3 are formed at the portions a predetermined distance set back from the end faces of lead terminals 2 opposing each other. By virtue of the existence of non-plated regions 6, formation of spread-out portions of fuse element 4 is prevented more positively as discussed in the following. As the material of plated layer 3, is used such a metallic material as tin, copper, silver, gold, nickel, and zinc. If formation of plated layers 3 is confined to the surfaces of the end portions of lead terminals 2 except, at least, opposing faces 5 opposing each other, it may be unnecessary to provide non-plated regions 6. Further, non-plated regions 6 may be provided by small amounts of edge burrs 12 produced at the cut faces of end portions 51 of lead terminals 2. Namely, as shown in FIG. 2A, a small amount of non-plated region 6 with width 32 may be secured by edge burr 12. Further, edge burrs 12 are protruded portions provided at end portions 51 of lead terminals 2 opposing each other and they are raised portions having curved surfaces 121. Edge burr 12 also serves for preventing plated layer 3 from being formed on opposing face 5.

Instead of providing plated layer 3, a metal paste such as a silver paste may be applied. Otherwise, metal depositing or sputtering may be applicable. Plating may be either electroplating or electroless plating, or an electroplated layer may be formed on an electroless plated layer. Further, plated layer 3 may be formed of a single layer or plural, two or more, layers. By forming plated layer 3 in plural layers, a merit can be obtained that weldability with fuse element 4 is enhanced and the strength of weld is secured. Further, it is preferable to select materials having good welding compatibility with the material of fuse element 4.

Fuse element 4 is a fusible member, which is welded onto plated layers 3 and electrically connected with lead terminals 2 through plated layers 3. Fuse element 4 is welded to lead terminals 2 at end portions thereof opposing each other and so connected as to span the pair of lead terminals 2. Fuse element 4 is a material to produce a fusing function. As current fuses, such material may be used as gold, copper, silver, nickel, aluminum, tin, and a compound or alloy of such materials. As temperature fuses, such low-melting point metal as tin, bismuth, indium, lead, and cadmium may be used as a single metal or an alloy having such metals mixed therein. In the present embodiment, a fuse element of a temperature fuse formed of a ternary alloy of tin, bismuth, and lead and having a melting point of 96° C. is used as fuse element 4. Although fuse element 4 used in the present embodiment is substantially rectangular parallelepiped, that in a disk shape, cylindrical shape, or linear shape may be used.

Although it is not shown in FIG. 1 and FIG. 2A, fuse element 4 may be welded onto the surfaces of plated layers 3 after applying a welding flux to the surfaces. The welding flux is an auxiliary agent for electrically connecting fuse element 4 with lead terminals 2 and it is selected after making it sure that its compatibility with the material of lead terminals 2 and the material of fuse element 4 is good. For example, a liquid flux of the rosin group may be selected as the welding flux.

In addition to the above mentioned components, cover film 27 may be provided to cover the fuse portion including fuse element 4 as shown in FIG. 1. This arrangement is meritorious because melted fuse element 4 is thereby prevented from spattering around. Further, cover film 27 may be formed of an upper and a lower film pasted together or may be formed of a single sheet of film rolled up. Further, flux 28 containing rosin and the like to facilitate melting down of fuse element 4 may be filled in the interior of cover film 27. This also prevents melted fuse element 4 from spattering around.

Further, fuse element 4 may be welded onto plated layer 3 after disposing meltable layer 13 for welding thereon as shown in FIG. 2B. Namely, the intermediate layer for welding may be formed of two layers of plated layer 3 and meltable layer 13. Thereby, such a merit can be obtained that the strength of connection between fuse element 4 and lead terminals 2 is enhanced. As meltable layer 13, a meltable metal such as a solder and silver paste is suitable.

Figure 3:
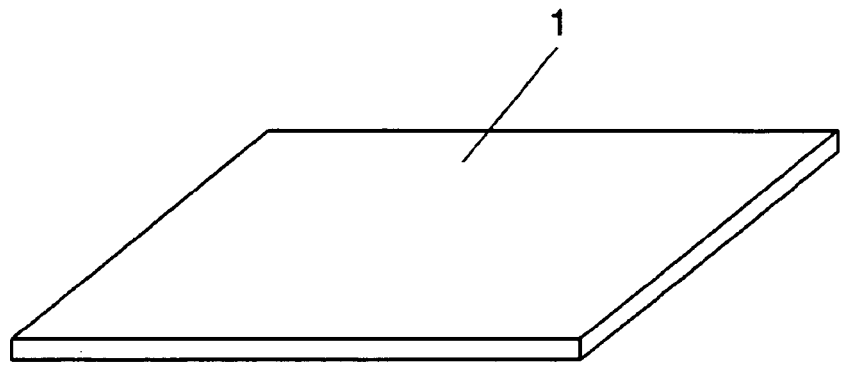
FIG. 3–FIG. 7 are drawings showing steps in manufacturing of the fuse shown in FIG. 1.
Figure 4:
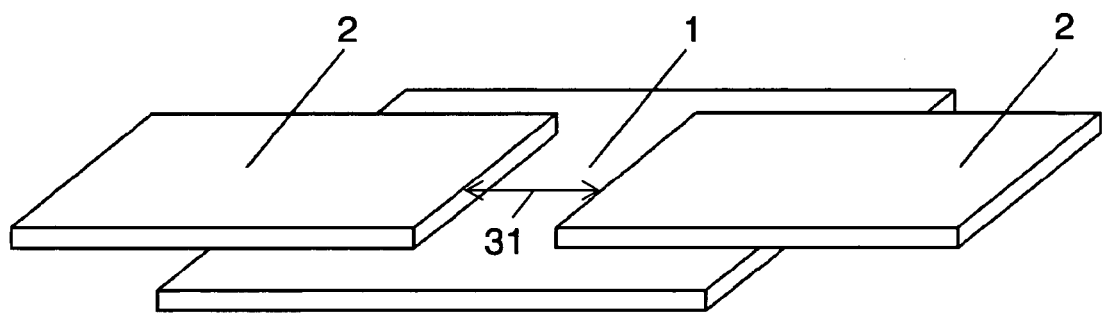
Figure 5:
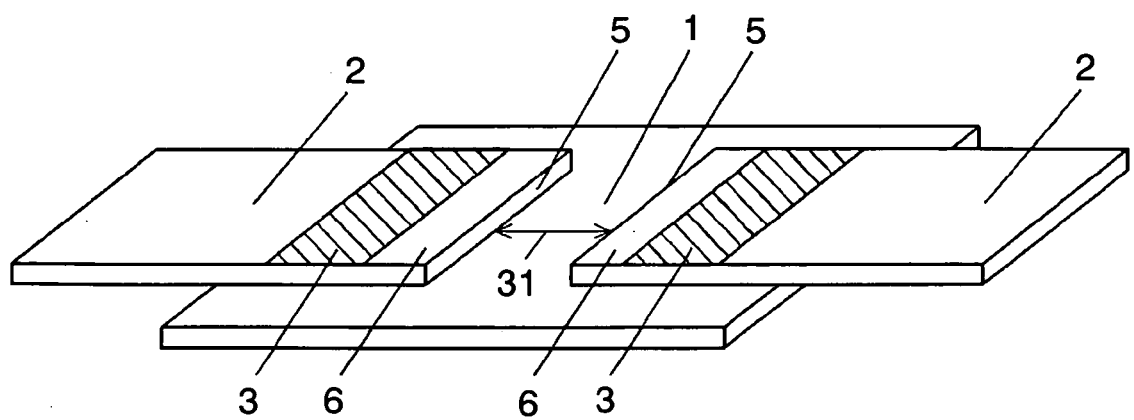
Figure 6:
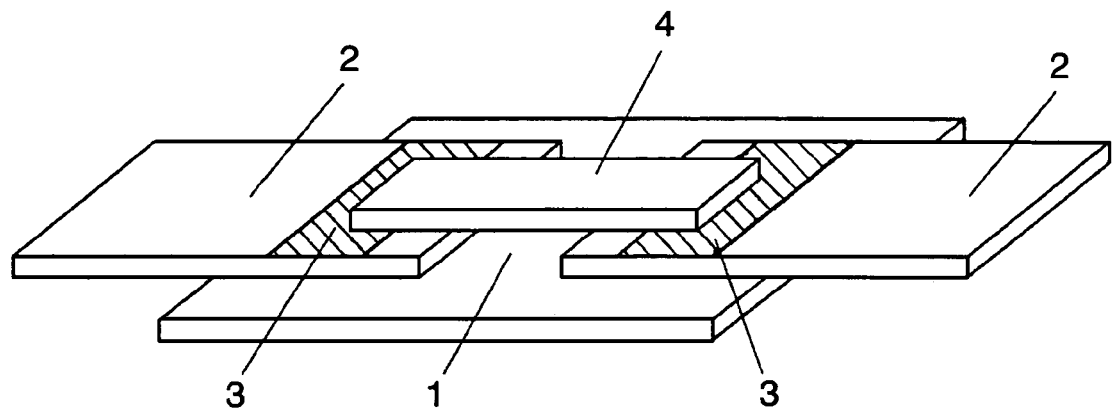
Figure 7:
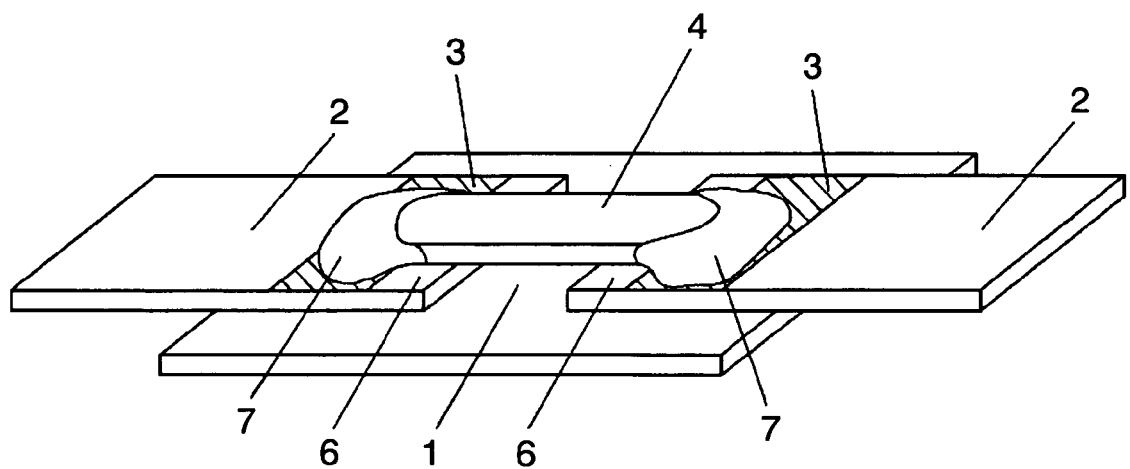
Figure 8A:
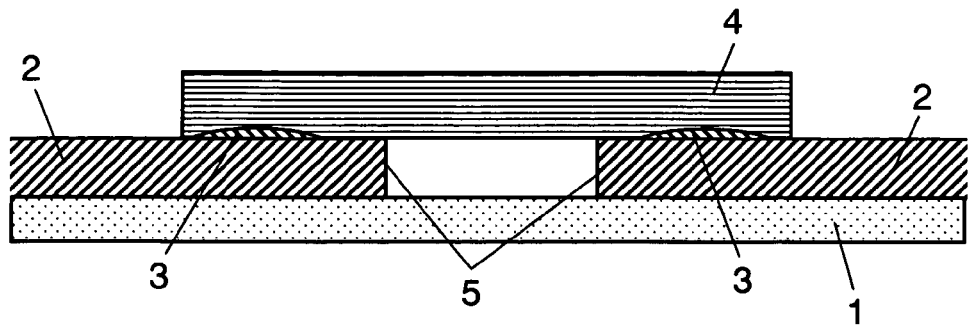
FIG. 8A–FIG. 8C are drawings showing steps in welding of a fuse element of the fuse shown in FIG. 1.
Figure 8B:
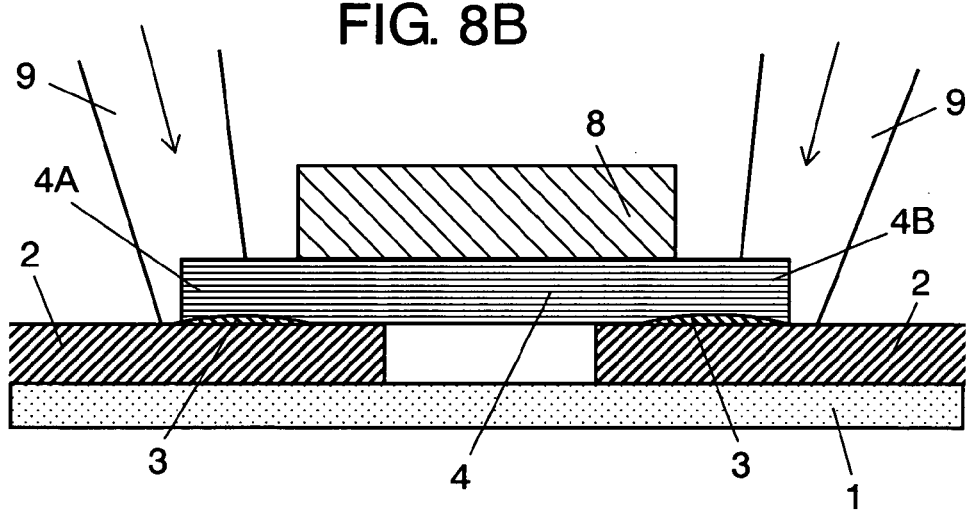
Figure 8C:
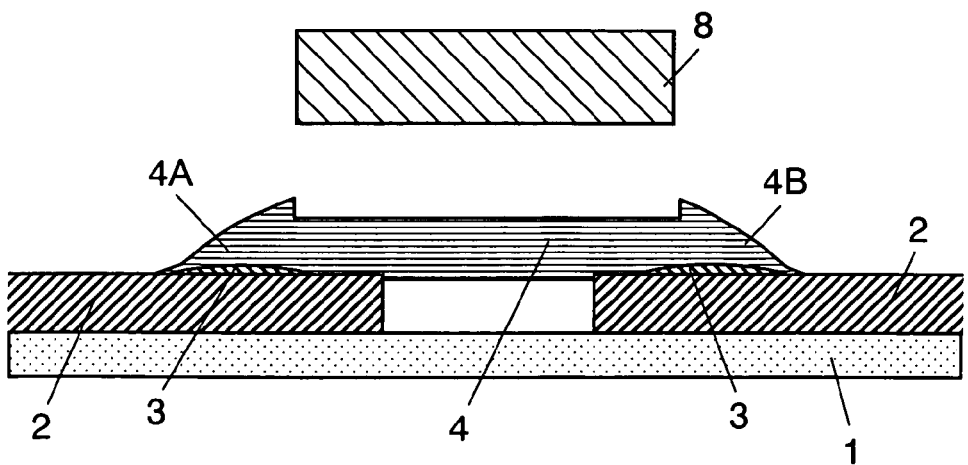
Figure 9:
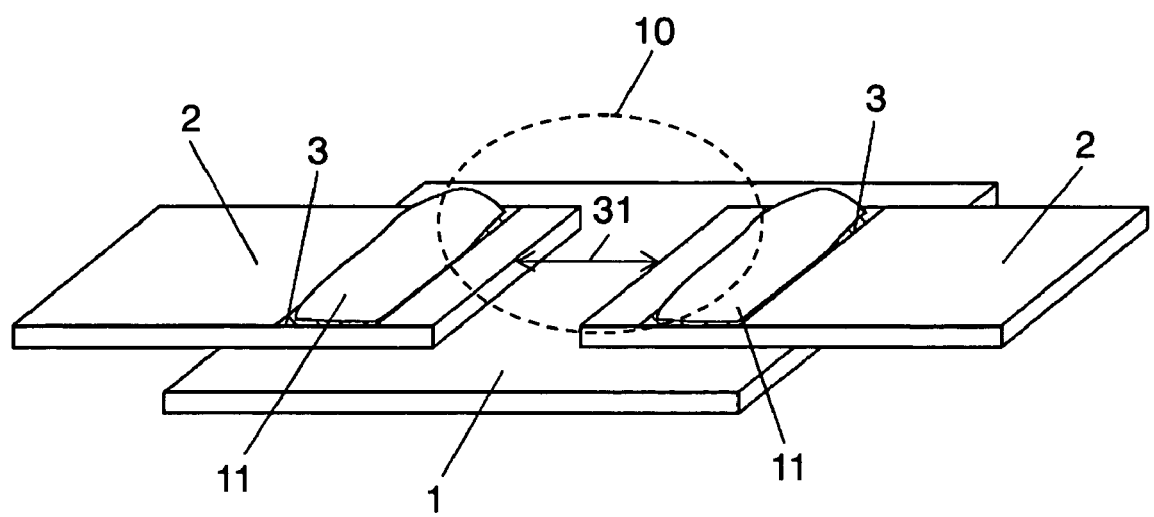
FIG. 9 is a perspective view showing the fuse of FIG. 1 with its fuse element melted down.

With reference to FIG. 3 to FIG. 8C, steps in manufacturing process of a fuse will be described below. FIG. 3 shows step 1, FIG. 4 step 2, FIG. 5 step 3, FIG. 6 step 4, and FIG. 7 shows step 5.

First, at step 1, substrate 1 is prepared. Then, at step 2, a pair of lead terminals 2 are bonded onto substrate 1. They are bonded via thermo-compression bonding, or a solvent including adhesive components is used for bonding. At this time, face-to-face distance 31 of lead terminals 2 is set so large that insulating capability between lead terminals 2 after melting down of fuse element 4 as described above can be secured. A metal ribbon or the like are cut to produce lead terminals 2. Then, edge burrs (protrusions) 12 are sometimes produced at end portions 51 of lead terminals 2 opposing each other as shown in FIG. 2A. Edge burrs 12, as described in the foregoing, serve as non-plated regions at step 3 that follows.

At subsequent step 3, plated layers 3 are formed on portions of the surfaces of lead terminals 2. At this time, plated layers 3 are formed on the portions of lead terminals 2 except opposing faces 5. When required, plated layers 3 are formed except non-plated regions 6 provided in ranges a predetermined distance set back from the opposing end faces of lead terminals 2. To achieve this, plating may be performed on lead terminals 2 after, for example, masking non-plated regions 6 and opposing faces 5 with a resin film or the like, and the resin film may be peeled off after plating. Otherwise, edge burrs 12 unavoidably formed by cutting work as described above may be positively utilized for preventing plated layers 3 from being formed on opposing faces 5. Further, when necessary, meltable layers 13 may be formed at least at a portion of the top face of plated layers 3 as shown in FIG. 2B. In that case, fuse element 4 is welded to meltable layers 13 at below discussed step 5. Further, when it is needed, a flux mainly composed of rosin may be placed on the surface of plated layers 3.

Then, at step 4, fuse element 4 formed of a fusible member is placed on lead terminals 2. Fuse element 4 here is in a parallelepiped shape. Due to placing fuse element 4 such that its end face comes within the range of the top face of plated layers 3, the welding to be described at step 5 becomes easy. Fuse element 4 may otherwise be placed beyond the range of plated layer 3.

Then, at step 5, fuse element 4 is welded onto plated layers 3. Due to being welded to plated layers 3, fuse element 4 is electrically connected to lead terminals 2 and enabled to function as a fuse. Weld portion 7 ensures connection of fuse element 4 to plated layer 3. According to need, fuse element 4 may be filled in cover film 27 or a case, or flux 28 may be applied to it. Fuse element 4 may be in an oval or linear form other than the rectangular parallelepiped form.

At steps 1 and 2, such processes are described in which plated layers 3 are formed on lead terminals 2 after lead terminals 2 have been bonded to substrate 1. Other than that, lead terminals 2 having been provided with plated layer 3 may be bonded to substrate 1. Otherwise, fuse element 4 may be welded to lead terminals 2 having been provided with plated layers 3 and, thereafter, lead terminals 2 may be bonded to substrate 1. Such processes may be suitably changed according to incurring cost and ease of processing.

Welding of fuse element 4 will now be described in detail with reference to FIG. 8A–FIG. 8C.

First, cooling plate 8 is placed, as shown in FIG. 8B, on the top face of fuse element 4 mounted on lead terminals 2 so as to span the same as shown in FIG. 8A. Cooling plate 8 has an effect to temporarily fix fuse element 4 onto lead terminals 2 mechanically and another effect to cool fuse element 4. As the material of cooling plate 8 to obtain a cooling effect, a material having a thermal conductivity of at least $20 W \cdot m^{-1} K^{-1}$ may be used. To be concrete, aluminum, magnesium, copper, titan, gold, silver, nickel, iron, carbon (graphite), and silicon may be used as a single metal, as an alloy of such metals, as an oxide or nitride, or a composite of them. In the case of the present embodiment, an aluminum alloy including at least 90% of aluminum is used.

There is glass as a material having thermal conductivity lower than $20 W \cdot m^{-1} K^{-1}$, namely $1.1\ W \cdot m^{-1}\ K^{-1}$. If such a material is used for cooling plate 8, the effect to temporarily fix fuse element 4 to lead terminals 2 mechanically can be obtained. However, at the time of welding of fuse element 4, fuse element 4 is spheroidized near the weld portion by the melting heat at the weld portion. Otherwise, there is formed a narrowed or broken portion between the center of fuse element 4 and the weld portion or an unwelded portion when the welding heat is low. Therefore, limits are imposed on welding conditions and the production yield is lowered in the case of mass production.

Then, end portions 4A, 4B of fuse element 4 are heated to be welded to plated layers 3. There are various ways for heating end portions 4A, 4B of fuse element 4. Such methods are possible as to heat lead terminals 2 with heaters, to pass a current through lead terminal 2 alone so that lead terminal 2 proper is heated to a high temperature, and to heat lead terminal 2, end portion 4A and end portion 4B directly with infrared rays. In the present embodiment, laser beams 9 of near-infrared regions are radiated in the direction indicated by the arrows. Thereby, plated layers 3 and fuse element 4 are welded together.

Then, cooling plate 8 is removed from the fuse element 4 after the welding as shown in FIG. 8C. Since fuse element 4 is melted only at end portions 4A, 4B, and scarcely melted at the portion kept in touch with cooling plate 8 during the welding, the cross-sectional configuration of fuse element 4 is kept. Therefore, the welding conditions are not so much limited and variations in resistance value are kept low even if the fuses are mass-produced and, hence, production yield is greatly improved.

In order to enhance the cooling effect of cooling plate 8, it is effective to place a liquid having a boiling point close to the melting point of fuse element 4 between cooling plate 8 and fuse element 4. Then, the cooling effect is enhanced by vaporization heat of the liquid. Further, due to the liquid filled in a small gap between cooling plate 8 and fuse element 4, the effect of heat conduction to the cooling plate 8 is enhanced. Further, by the liquid washing out dirt on cooling plate 8 due to repeated use of it, foreign substances are prevented from attaching to cooling plate 8. To be concrete, pure water, methanol, ethanol, propanol, and butanol may be used. A solvent used in a liquid flux is preferably used.

Through the above steps of processing, fuse element 4 and plated layers 3 are welded together and thereby lead terminals 2 are electrically connected with fuse element 4.

Since, at this time, plated layers 3 are formed at the portions excluding opposing faces 5, fuse element 4 as a fusible member is prevented from forming spread-out portions over opposing faces 5. Further, when plated layers 3 are formed at the portions excepting, further, non-plated regions 6, which are set back from the opposing faces of lead terminals 2, practically no spread-out portions are formed. Therefore, formation of spread-out portions to shorten the insulation distance of lead terminals 2, as is in the case with the prior art where the plated layers were formed on the faces including the opposing faces, can be prevented from occurring at the time of welding of fuse element 4. Thus, the insulation distance is prevented from being narrowed and the preset distance 31 for securing insulating capability can be maintained.

Below will be given description about melting down of fuse element 4. Fuse element 4 is a fusible member and made of metal or the like as a conductor. Therefore, a current flows between lead terminals 2 through fuse element 4. When the flow of current exceeds a predetermined value and becomes an overcurrent, fuse element 4 generates heat greatly and exceeds its melt-down temperature to be melted down. Likewise, when electronic equipment or a battery pack incorporating a fuse generates heat abnormally to raise its temperature, the fuse exceeds its melt-down temperature to be melted down. The former is a case where the fuse is used as a current fuse and the latter is a case where the fuse is used as a temperature fuse.

FIG. 9 shows a fuse as have been melted down. Incidentally, there are not shown cover film 27 and flux 28 in FIG. 9. When fuse element 4 melts down upon exceeding its melt-down temperature, fuse element 4 is torn apart at melted portion 10 toward the sides of both lead terminals 2 so as to collect on the upper surfaces of plated layers 3. As a result, melted-down fusible member 11 coagulates on each of the top faces of two plated layers 3. Hence, melted-down fusible members 11 produced by melting down of fuse element 4 are prevented from being spread out into the space between the opposing sides of lead terminals 2. Namely, melted-down fusible members 11, even after being melted down, are not spread out into the space between lead terminals 2 and, hence, the insulation distance is not narrowed. Therefore, the insulation distance is maintained as preset face-to-face distance 31 after the melting down, and hence insulating capability can be fully maintained. In the case of the prior art where plated layers 101 are disposed as far as they reach opposing faces 102, melted fuse element 104 is spread out over plated layers 101 and, thereby, the insulation distance is decreased corresponding to the spread-out amount. In this case, although the face-to-face distance is determined at the stage of designing to secure required insulating capability, the insulation distance after the melting down becomes shorter than the designed face-to-face distance and there arises the possibility that the designed insulating capability becomes unobtainable. If, allowing for it, the face-to-face distance is set larger at the time of designing, reduction in size of the fuse cannot be attained. In the case of the fuse of the present embodiment, in contrast with prior art fuses, spread-out portions are not formed on opposing faces after the melting down and, hence, insulating capability can be secured.

Therefore, in contrast to the case of melting down in the prior art fuses, the face-to-face distance of lead terminals after melting down, i.e., the insulation distance, can be maintained the same as face-to-face distance 31 set at the time of designing. Hence, a fuse can be constructed with a smaller terminal-to-terminal distance. As a result, a fuse smaller in size than that in the prior art can be realized and, also, by the use of the fuse, it becomes possible to configure a temperature fuse and current fuse very small in size.

Figure 10A:
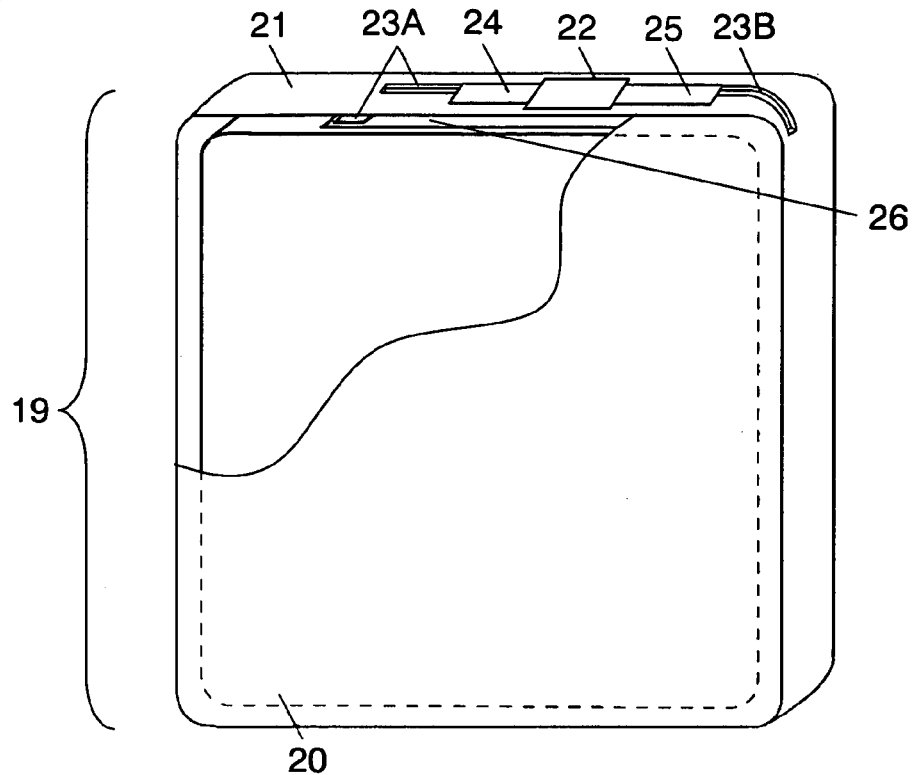
FIG. 10A and FIG. 10B are perspective views with a portion broken away of a pack battery according to an embodiment of the present invention.
Figure 10B:
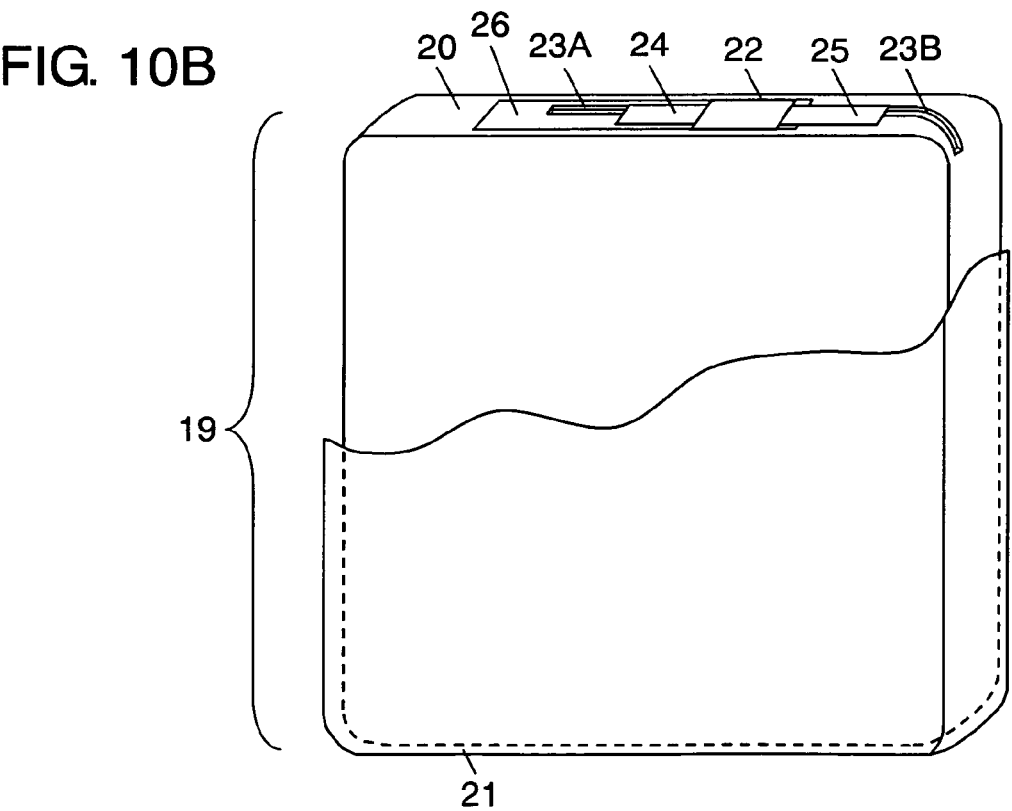
Figure 11:
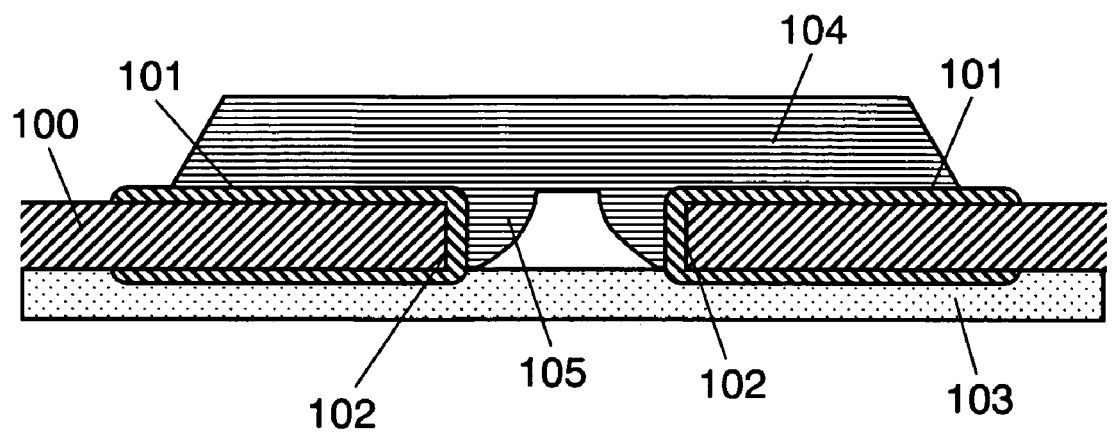
FIG. 11 is a lateral sectional view of a conventional fuse.
Figure 12:
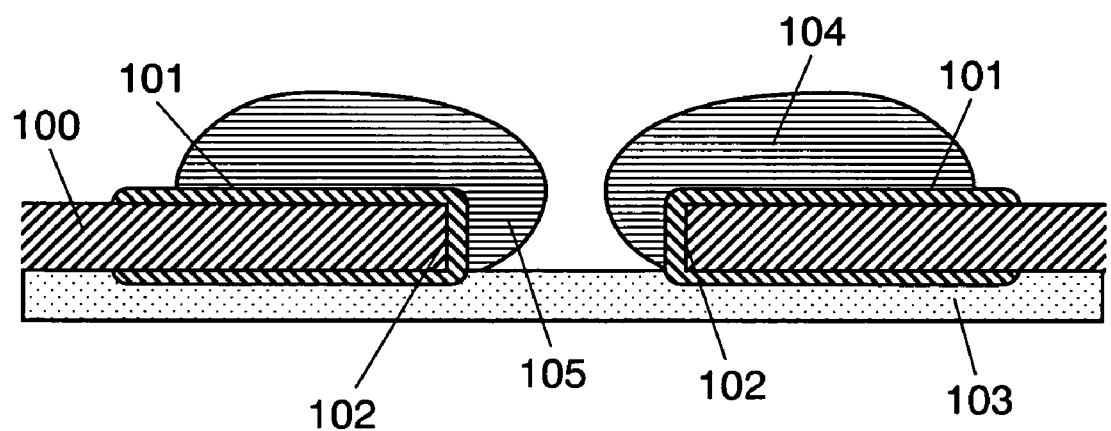
FIG. 12 is a lateral sectional view of the conventional fuse with its fuse element melted down.

Now will be described an example in which the fuse configured as above is applied to a battery pack, hereinafter. FIG. 10A, FIG. 10B are perspective views with a portion broken away of a battery pack according to the present embodiment of the invention.

Fuse 22 is a fuse of the above described configuration and it is used as a temperature fuse. In fuse 22, a pair of lead terminals 24, 25 are bonded to the top of a substrate and a fuse element made of a fusible member is welded to lead terminals 24, 25 so as to span the same. The fuse element is welded to lead terminals 24, 25 through the plated layers which are formed thereon except opposing faces of the lead terminals. Hence, the fuse element even after it has been melted down is prevented from being spread out over the opposing faces of the lead terminals. Further, a center of fuse 22 is covered with a cover film made of PEN (polyethylene naphthalate) and a flux containing rosin and the like as the main components is sealed therein.

Wiring 23A is led out from either positive or negative terminal 26 of battery 20. One lead terminal 24 of fuse 22 is connected with wiring 23A led out from battery 20, while the other lead terminal 25, is connected with wiring 23B across fuse 22. Wiring 23B is led out of the outside of casing 21, constituting the main body of pack battery 19, as a battery terminal of the same polarity as that connected with wiring 23A (namely, a positive or negative terminal of battery 20) and connected to another electronic component (not shown) to realize power supply. The terminal of opposite polarity of battery 20 is led out separately and connected to the electronic component. Thereby, power is supplied from pack battery 19 to the electronic component. Namely, fuse 22 is attached to either positive or negative terminal 26 of pack battery 19 and disposed between wirings 23A, 23B.

When abnormal heat is produced in pack battery 19, the fuse element made of a fusible member is melted down and fuse 22 is rendered non-conductive. Hence, power supply from pack battery 19 is cut off. By the cutoff of the power supply, heat production thereafter is suppressed and occurrence of damage to the user due to the abnormal heat can be prevented. Further, even when the current value becomes abnormally large, the fuse element melts down due to heat produced by the overcurrent, whereby fuse 22 is rendered non-conductive. Thereby, influence to the user and failure of the electronic equipment caused by overcurrent thereafter can be prevented.

At this time, even after the melting down, the melted fuse element is prevented from being spread out over the opposing faces of lead terminals 24, 25 as described above. Accordingly, such a problem does not arise that the insulation distance becomes shorter after the melting down and a proper insulating capability is made unobtainable. With prior art fuses, there are cases where objects to be attained by the fuses, i.e., protection of electronic equipment and users from abnormal heating and overcurrent, are unattainable, though the fuse has been melted down, because of the formation of the spread-out portions and, hence, sufficient insulation is not secured. In contrast therewith, in the case of fuses of the present embodiment, the insulation distance is not shortened and maintained as the preset face-to-face distance after the melting down, and hence the insulating capability is maintained as originally designed. Therefore, electronic equipment and users are protected by the melting down from abnormal temperature or over current. Further, since the insulation distance is not shortened by the melting down, it is possible to design originally the distance between the lead terminals at the minimum value capable of securing sufficient insulation. Thus, it is made possible to produce fuse 22 in small size. Therefore, even if pack battery 19 is made smaller sized and lower profiled, a fuse can be mounted thereon and, hence, it is made possible to provide a fuse capable of keeping pace with the development of miniaturization of pack battery 19.

An example where fuse 22 is mounted on pack battery 19 is shown in FIG. 10A. Otherwise, the fuse can function as a current fuse even if it is mounted on an electronic substrate or around an IC.

Further, pack battery 19 is mounted on a mobile telephone, personal digital assistance, notebook-size computer, and the like. The same may be said, not only of the battery mounted on such electronic apparatuses as mentioned above, but also of the battery mounted on a desktop personal computer and precision electronic instrument. In order that such electronic apparatuses are protected from abnormal heat and over-current and that users are prevented from suffering damage before it occurs, mounting of a fuse on them is important. In this connection, while a large number of pieces of electronic equipment are being made smaller sized, lower profiled, and more densely packed, miniaturization of fuses mounted on them becomes important. Under these circumstances, since the insulation distance of the lead terminals after the fuse has melted down and the face-to-face distance of the lead terminals designed for securing insulation can be made identical, very small fuses can be realized. Therefore, it becomes possible to meet requirements for the electronic equipment incorporating the fuses.

Although fuse 22 is disposed so as to contact with casing 21 forming the body of pack battery 19 in FIG. 10A, it may be disposed in contact with battery 20 as shown in FIG. 10B to operate more accurately as a temperature fuse.

Although the intermediate layers including plated layers 3 or meltable layers 13 are provided on a pair of lead terminals 2 in the present embodiment, the intermediate layer may be provided on only one of lead terminals 2. This structure has an effect like that including intermediate layers on both lead terminals 2 as described above. Edge burrs (protrusions) 12 or protruded portions having curved surfaces 121 may be provided on only one of lead terminals 2.

In the present invention, intermediate layers for welding used in the welding of a fuse element to lead terminals are formed on the lead terminals except opposing faces of the lead terminals. Thereby, formation of spread-out portions over the opposing faces of the lead terminals is prevented from occurring when the fuse element is welded, and hence the insulation distance is prevented from being narrowed. Further, when the fuse element has been melted down, the melted fuse element is prevented from being spread out over the opposing faces. Hence even after the melting down, the insulation distance remains intact and the insulating capability is secured. Therefore, the face-to-face distance of the lead terminals set at designing can be made equal to the distance required for securing the insulating capability. Accordingly, the face-to-face distance can be originally set to a minimum possible value and it is made possible to realize small sized and low profiled fuses. Further, it is made possible to realize miniaturization of pack batteries with a fuse mounted thereon and electronic equipment incorporating such a battery.

What is claim is:

1. A fuse comprising:
   a substrate;
   a first lead terminal disposed on the substrate, the first lead terminal having a top surface and an end face;
   a second lead terminal disposed on the substrate, the second lead terminal having a top surface and an end face;
   a first intermediate layer formed on the top surface of the first lead terminal;
   a second intermediate layer formed on the top surface of the second lead terminal; and
   a fuse element made of a fusible member and coupled to the first and second lead terminals through the first intermediate layer and the second intermediate layer such that the fuse element spans the first and second lead terminals,
   wherein the first and second lead terminals are arranged such that the end face of the first lead terminal and the end face of said second lead terminal oppose each other, with a gap separating the end face of the first lead terminal from the end face of the second lead terminal, and
   wherein the first intermediate layer is disposed at a predetermined distance, which is more than zero, from the intersection between the top surface of the first lead terminal and the end face of the first lead terminal.

2. The fuse according to claim 1,
   wherein the first intermediate layer includes a plated layer.

3. The fuse according to claim 2,
   wherein the first intermediate layer further includes a meltable layer for welding disposed on the plated layer.

4. The fuse according to claim 1,
   wherein the end face of the first lead terminal is located on a first plane,
   wherein the end face of the second lead terminal is located on a second plane, and
   wherein the first intermediate layer formed on the top surface of the first lead terminal is disposed so as not to extend to the first plane.

5. The fuse according to claim 1,
   wherein at least one of the first and second lead terminals has a protruded portion formed on an end portion thereof, the end portion being located adjacent to one of the end faces of the first and second lead terminals.

6. The fuse according to claim 5,
   wherein the protruded portion prevents at least the first intermediate layer from being formed on the end face of the first lead terminal.

7. The fuse according to claim 5,
   wherein the protruded portion is an edge burr present on the end portion of at least one of the first and second lead terminals.

8. The fuse according to claim 5,
   wherein the protruded portion is a raised portion present at the end portion of at least one of the first and second lead terminals, and
   wherein the protruded portion has a curved surface.

9. The fuse according to claim 5,
   wherein the protruded portion is formed on a cut face of the end portion of at least one of the first and second lead terminals.

10. The fuse according to claim 1, further comprising a cover film for covering the fuse element.

11. The fuse according to claim 10, further comprising flux containing rosin, wherein the flux is sealed in the cover film.

12. The fuse according to claim 1,
    wherein the fuse is at least one of a temperature fuse and a current fuse.

13. The fuse according to claim 1, wherein the fuse element is welded to the first and second lead terminals through the first intermediate layer and the second intermediate layer.

14. The fuse according to claim 1, wherein the second intermediate layer is disposed at a predetermined distance, which is more than zero, from the intersection between the top surface of the second lead terminal and the end face the second lead terminal.

15. A pack battery comprising:
  a battery;
  a body housing the battery;
  a wiring led out from the body and electrically connected to the battery; and
  a fuse including:
    a substrate;
    a first lead terminal disposed on the substrate, the first lead terminal having a top surface and an end face;
    a second lead terminal disposed on the substrate, the second lead terminal having a top surface and an end face;
    a first intermediate layer formed on the top surface of the first lead terminal;
    a second intermediate layer formed on the top surface of the second lead terminal; and
    a fuse element made of a fusible member and coupled to the first and second lead terminals through the first intermediate layer and the second intermediate layer so as to span the first and second lead terminals,
  wherein the first and second lead terminals are arranged such that the end face of the first lead terminal and the end face of said second lead terminal oppose each other, with a gap separating the end face of the first lead terminal from the end face of the second lead terminal, and
  wherein the first intermediate layer is disposed at a predetermined distance, which
  is more than zero, from the intersection between the top surface of the first lead terminal and the end face of the first lead terminal.

16. The pack battery according to claim 15, wherein the fuse is in contact with the body.

17. The pack battery according to claim 15, wherein the fuse is in contact with the battery.

18. The battery pack according to claim 15, wherein the fuse element is welded to the first and second lead terminals through the first intermediate layer and the second intermediate layer.

19. The battery pack according to claim 15, wherein the second intermediate layer is disposed at a predetermined distance, which is more than zero, from the intersection between the top surface of the second lead terminal and the end face the second lead terminal.

20. A method of manufacturing a fuse comprising:
  A) bonding a first lead terminal and a second lead terminal on a substrate;
  B) forming a first intermediate layer on a top surface of the first lead terminal, and a second intermediate layer on a top surface of the second lead terminal; and
  C) welding the fuse element to the first intermediate layer and the second intermediate layer such that the fuse element spans the first and second lead terminals,
  wherein the first and second lead terminals are arranged such that an end face of the first lead terminal and an end face of the second lead terminal oppose each other, with a gap separating the end face of the first lead terminal from the end face of the second lead terminal, and
  wherein the first intermediate layer is formed on the top surface of the first lead terminal at a predetermined distance, which is more than zero, from the intersection between the top surface of the first lead terminal and the end face of the first lead terminal.

21. The method of manufacturing a fuse according to claim 20, wherein step B comprises:
  D) forming a first plated layer on the first lead terminal and a second plated layer on the second lead terminal; and
  E) forming a first meltable layer for welding on the top surface of the first plated layer and a second meltable layer for welding on the top surface of the second plated layer,
  wherein the fuse element is welded to the first meltable layer for welding and the second meltable layer for welding at step C.

22. The method of manufacturing a fuse element according to claim 20, further comprising:
  F) producing the first and second lead terminals by cutting work and providing a protrusion on an end portion where the first and second lead terminals oppose each other.

23. The pack battery according to claim 15,
  wherein the end face of the first lead terminal is located on a first plane,
  wherein the end face of the second lead terminal is located a second plane, and
  wherein the first intermediate layer formed on the top surface of the first lead terminal is disposed so as not to extend to the first plane.

24. The fuse according to claim 1, wherein the first intermediate layer is formed on the top surface of the first lead terminal by one of applying a metal paste, metal depositing, or sputtering.

25. A method of manufacturing a fuse according to claim 20, wherein the second intermediate layer is formed on the top surface of the second lead terminal at a predetermined distance, which is more than zero, from the intersection between the top surface of the second lead terminal and the end face of the second lead terminal.

* * * * *

UNITED STATES PATENT AND TRADEMARK OFFICE
CERTIFICATE OF CORRECTION

| | | |
|---|---|---|
| PATENT NO. | : 7,106,165 B2 | Page 1 of 1 |
| APPLICATION NO. | : 10/878741 | |
| DATED | : September 12, 2006 | |
| INVENTOR(S) | : Takahiro Mukai et al. | |

It is certified that error appears in the above-identified patent and that said Letters Patent is hereby corrected as shown below:

Title Page,
Item [56], Foreign Patent Documents, page 2, left column, "JP 2001-113784" should read --JP 2000-113784--.

Signed and Sealed this

Thirtieth Day of January, 2007

JON W. DUDAS
*Director of the United States Patent and Trademark Office*